US009790947B2

(12) United States Patent
Parodi et al.

(10) Patent No.: US 9,790,947 B2
(45) Date of Patent: Oct. 17, 2017

(54) FAN ASSEMBLY

(71) Applicant: Johnson Electric S.A., Murten (CH)

(72) Inventors: Davide Parodi, Asti (IT); Giovanni Delsant, Ferrere (IT)

(73) Assignee: Johnson Electric S.A., Murten (CH)

( * ) Notice: Subject to any disclaimer, the term of this patent is extended or adjusted under 35 U.S.C. 154(b) by 281 days.

(21) Appl. No.: 14/630,132

(22) Filed: Feb. 24, 2015

(65) Prior Publication Data

US 2015/0240823 A1    Aug. 27, 2015

(30) Foreign Application Priority Data

Feb. 24, 2014    (IT) .............................. TO2014A0150

(51) Int. Cl.
| | | |
|---|---|---|
| *F04D 25/08* | (2006.01) | |
| *F04D 19/00* | (2006.01) | |
| *F04D 29/58* | (2006.01) | |
| *F04D 25/06* | (2006.01) | |
| *B60K 11/04* | (2006.01) | |

(52) U.S. Cl.
CPC ......... *F04D 25/082* (2013.01); *F04D 19/002* (2013.01); *F04D 25/0613* (2013.01); *F04D 29/5806* (2013.01); *B60K 11/04* (2013.01)

(58) Field of Classification Search
CPC ............... F04D 25/082; F04D 25/0613; F04D 29/5806; H02K 9/02; H02K 9/04; H02K 9/06

USPC .................. 417/373; 361/709; 165/80.3, 185
See application file for complete search history.

(56) References Cited

U.S. PATENT DOCUMENTS

| | | | |
|---|---|---|---|
| 6,384,494 B1 * | 5/2002 | Avidano ................... | H02K 9/06 310/58 |
| 8,057,167 B2 * | 11/2011 | Suzuki .................. | F04D 25/082 415/175 |
| 2004/0223845 A1 | 11/2004 | Caplan et al. | |
| 2012/0169160 A1 * | 7/2012 | Horng ................. | F04D 25/0613 310/59 |
| 2012/0207631 A1 * | 8/2012 | Lehmann ............ | F04D 25/0613 417/423.1 |
| 2014/0064941 A1 | 3/2014 | Parodi et al. | |

* cited by examiner

*Primary Examiner* — Charles Freay
*Assistant Examiner* — Kenneth J Hansen
(74) *Attorney, Agent, or Firm* — Muncy, Geissler, Olds & Lowe, P.C.

(57) ABSTRACT

A fan assembly has a support structure and a motor fixed to the support structure. The motor has a stator, an outer rotor and a controller. Components of the controller are in a thermal exchange relationship with a plate-like heat sink at one end of the stator. A fan, fixed to the rotor, has a hollow hub from which blades extend. Air flows through inlet openings in a front wall of the hub. The heat sink has a slit with an outer side, axially offset from the inner side. A portion of the heat sink forms a wing deflecting part of the air flow coming from the inlet openings through the slit to pass over the surface of the heat sink.

16 Claims, 6 Drawing Sheets

FAN ASSEMBLY

CROSS REFERENCE TO RELATED APPLICATIONS

This non-provisional patent application claims priority under 35 U.S.C. §119(a) from Patent Application No. TO2014A000150 filed in Italy on Feb. 24, 2014, the entire contents of which are hereby incorporated by reference.

FIELD OF THE INVENTION

This invention relates to a fan assembly and in particular, to a fan assembly used in a cooling fan module for a heat exchanger of a motor vehicle.

BACKGROUND OF THE INVENTION

More specifically, the invention relates to a fan assembly of the type comprising: a fixed support structure, including an outer frame and an inner member connected to the frame by a plurality of spokes or the like; an electric motor, particularly a brushless D.C. motor, including a stator fixed to the inner member, a rotor, and a controller having components in a thermal exchange relationship with an essentially plate-like heat sink which extends transversely with respect to the axis of the motor at one end of the stator; and a fan, fixed to the rotor of the motor at the other end of the stator and having a hollow hub from which a plurality of blades extend; the hub having a front wall intended to be struck by the air flow caused by the fan, and a lateral skirt which surrounds the motor defining an annular space with respect thereto; a plurality of inlet openings being provided in the front wall of the hub to allow air to flow through the annular space, and over the motor and the heat sink.

A fan assembly of this type is described in US patent application publication no. US2014/0064941 (A1).

SUMMARY OF THE INVENTION

One object of the present invention is to provide a fan assembly of the aforesaid type, with an improved heat sink, adapted to allow efficient heat removal even if it is made from simple stamped sheet metal instead of die-cast metal.

Accordingly, in one aspect thereof, the present invention provides a fan assembly, particularly for a heat exchanger of a vehicle, comprising: a fixed support structure, including an outer frame and an inner member connected to the frame by a plurality of spokes; an electric motor, including a stator fixed to the inner member, and a rotor rotatable with respect to the stator, and a controller having components in a thermal exchange relationship with a plate-like heat sink which extends transversely with respect to the axis of the motor at one end of the stator; and a fan, fixed to the rotor at the other end of the stator and having a hollow hub from which a plurality of blades extend; the hub having a front wall intended to be struck by the air flow caused by the fan and a lateral skirt which surrounds the motor defining an annular space with respect thereto; a plurality of inlet openings being provided in said front wall through which air flows into the annular space, wherein the heat sink has a slit in a peripheral region facing the annular space, the slit extends in a direction forming an angle with respect to the radial direction, and has an outer side offset with respect to the inner side away from the motor, a portion of the heat sink adjacent to the outer side of the slit forming a wing adapted to deflect, in use, part of the air flow coming from the annular space, sending it through the slit to pass over the surface of the heat sink adjacent to the inner side of the slit.

Preferably, the heat sink is made of cut and stamped sheet metal.

Preferably, the heat sink has an associated deflector positioned close to the outer surface of the heat sink, close to the slit, so as to define, between the deflector and the heat sink, at least one path for part of the flow of air which, in use, comes out from the slit.

Preferably, the deflector takes the form of a corrugated sheet, having a plurality of parallel corrugations arranged in a direction essentially orthogonal to the direction of the slit.

Preferably, the heat sink has at least one outwardly projecting boss, at the position of a corresponding component of the controller, and the deflector correspondingly has an opening surrounding the boss, so that, in use, the air flow channeled between the heat sink and the deflector is directed to pass over the boss.

Preferably, the inner member is annular.

Preferably, the motor is an outer rotor motor.

Preferably, the motor is a brushless motor.

Preferably, the motor is a D.C. motor.

Preferably, the hub has a plurality of inner ventilation vanes which extend from an inner surface of the hub and are adapted to generate, in use, a flow of air through the annular space.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
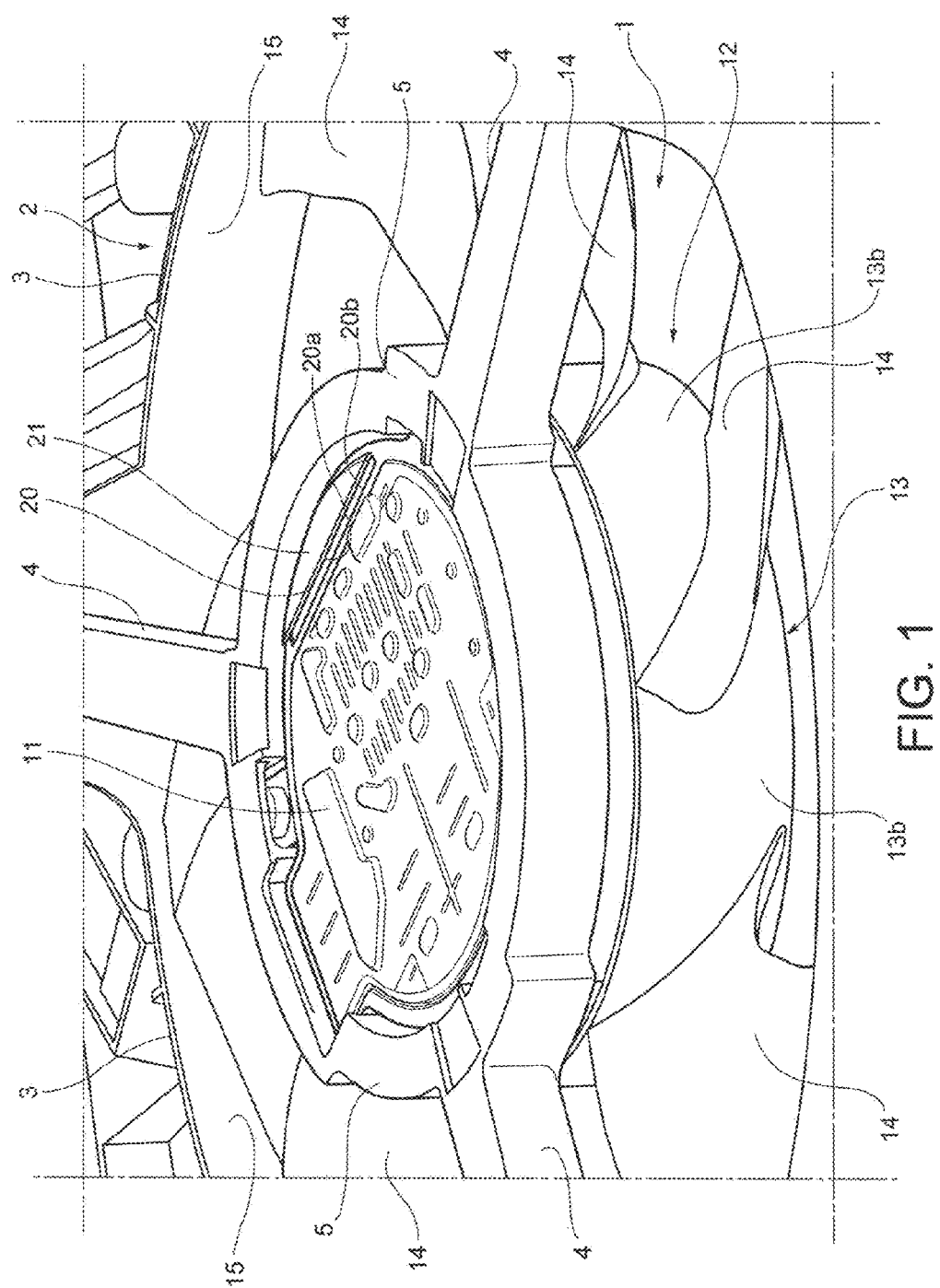
FIG. 1 is a perspective rear view of a fan assembly according to the present invention.
Figure 2:
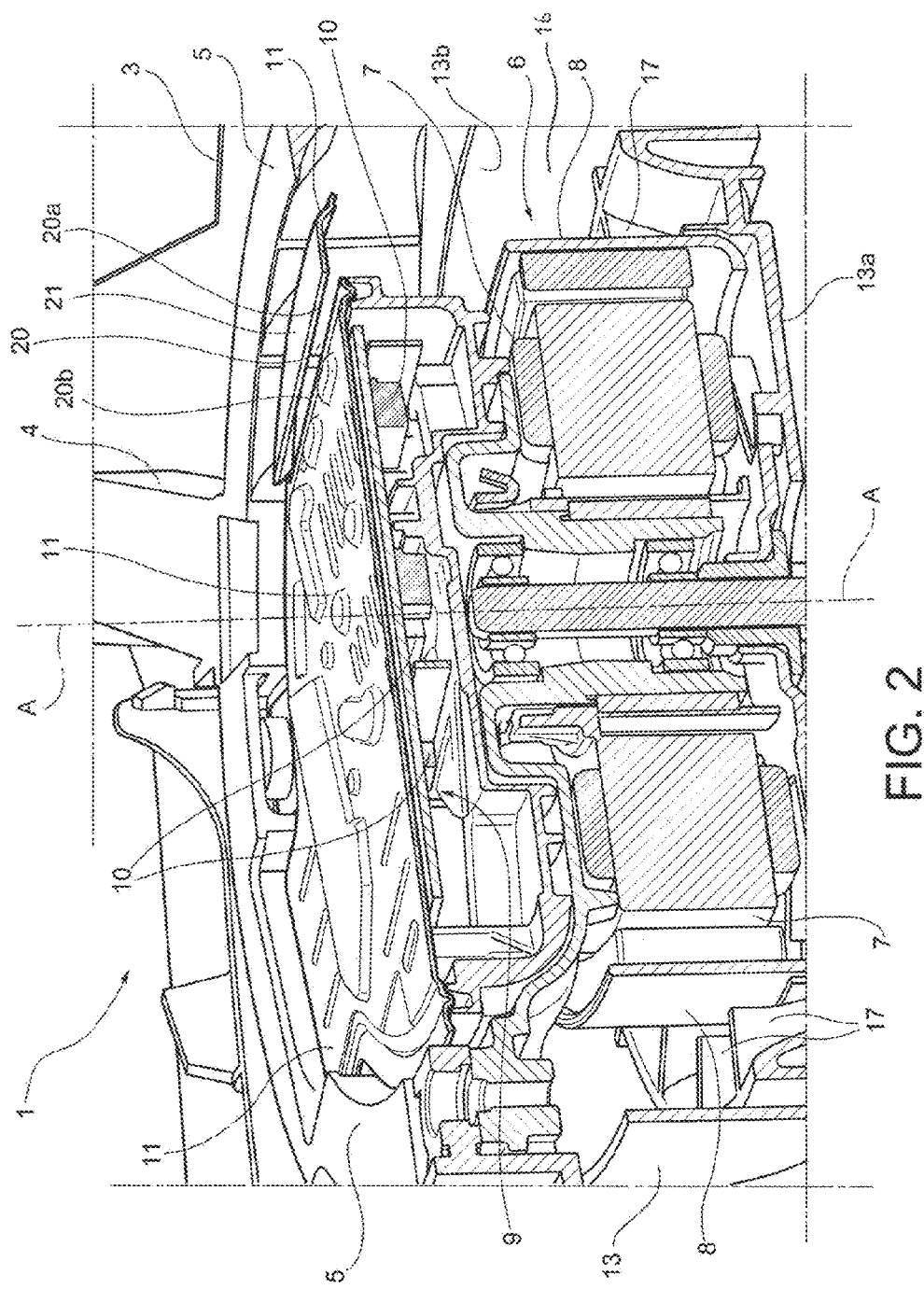
FIG. 2 is a sectional perspective view, taken along line II-II of FIG. 1.

In the drawings, and particularly in FIGS. 1 and 2, the number 1 indicates the whole of a fan assembly according to the present invention, which can be used, in particular, for cooling a heat exchanger, such as a radiator, of a motor vehicle.

The fan assembly 1 comprises a support structure, indicated as a whole by 2, which is fixed in operation. In a known way, the support structure 2 comprises an outer frame 3, which, in the embodiment illustrated by way of example, is ring-shaped, and is connected by a plurality of spokes 4 (FIG. 1) to an inner member 5, which also may be ring-shaped.

Figure 3:
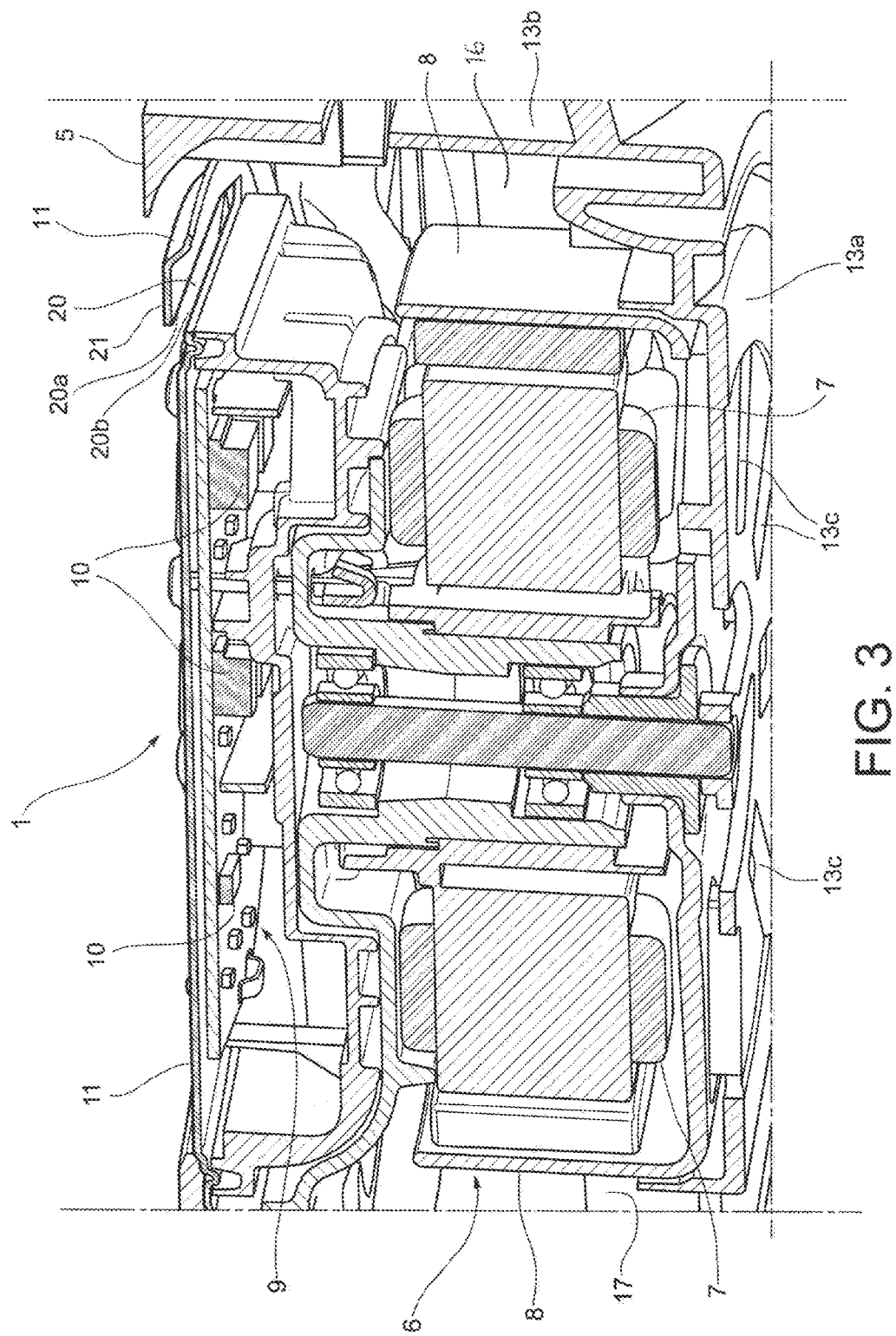
FIG. 3 is another sectional perspective view, similar to that of FIG. 2.
Figure 4:
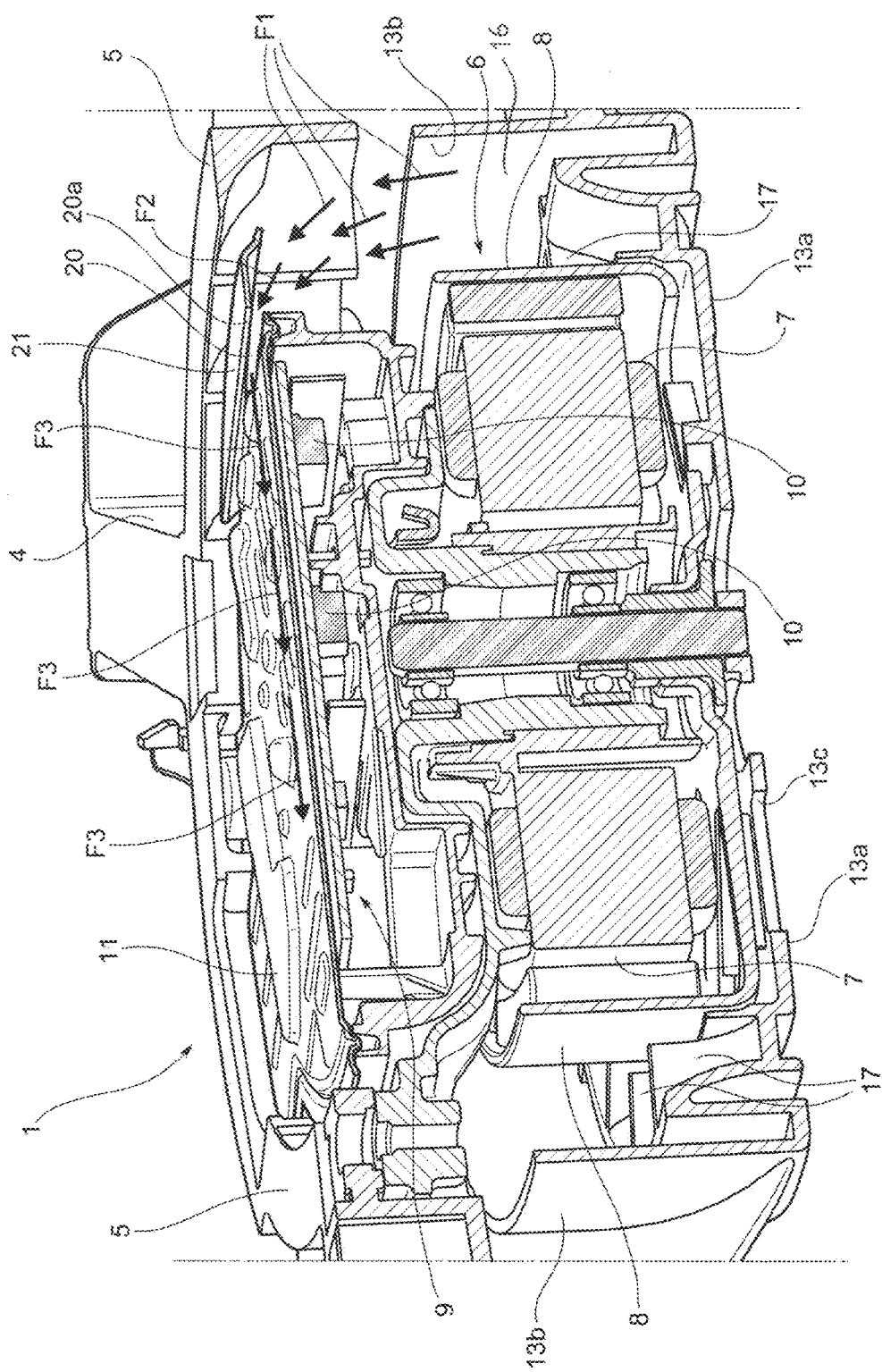
FIG. 4 shows, on an enlarged scale, part of FIG. 2.

As can be seen more clearly in FIGS. 2 to 4, the fan assembly 1 comprises an electric motor, particularly a D.C.

motor of the brushless type, indicated as a whole by 6. The motor includes a stator 7, fixed in a known way to the inner member 5 of the support structure 2, and a rotor 8 which extends about the stator. Thus, the illustrated motor is an outer rotor motor.

The motor 6 is associated with an electronic control circuit or controller 9, of which the components, indicated generically by 10 in FIGS. 2 and 4, are in a thermal exchange relationship with a plate-like heat sink 11 which extends transversely with respect to the axis A-A of the motor 6 near the rear end of the stator 7. The heat sink 11 may conveniently be made by cutting and stamping a metal sheet.

The fan assembly 1 further comprises an impeller or fan, indicated as a whole by 12 in FIG. 1. The fan 12 is fixed to the rotor 8 at the end of the stator 7 opposite the heat sink 11.

The fan 12 comprises a hollow hub 13, from which there extends a plurality of blades 14, the radially outermost ends of which are joined to a ring 15 extending in the proximity of the frame or outer ring 3 of the support structure 2 (FIG. 1).

The hub 13 of the fan 12 has a front wall 13*a* (see FIG. 3 in particular) intended to be struck by the air flow caused by the fan 12. The hub 13 also has an essentially cylindrical lateral skirt 13*b* which surrounds the motor 6, defining an annular space 16 with respect thereto. The hub 13 is further provided with a plurality of inner ventilation vanes 17 which extend from the inner surface thereof. The vanes 17 are adapted to generate, in use, within the annular space 16, a flow of cooling air which passes over the motor 6 and the heat sink 11. A plurality of inlet openings 13*c* is provides in the front wall 13*a* of the hub 13 to allow air to flow into the annular space 16 (FIG. 3).

With reference to FIGS. 1 to 4, in a peripheral region facing the annular space 16, the heat sink 11 has a slit 20, which in the embodiment illustrated by way of example, extends in a chordal direction, that is to say essentially orthogonally to a radial direction passing through the axis A-A. The slit 20 has an outer side 20*a*, offset with respect to the inner side 20*b* in a direction away from the motor 6.

The portion of the heat sink 11 adjacent to the outer side 20*a* of the slit 20 forms a wing 21 adapted to deflect, in use, part of the air flow coming from the annular space 16, sending it through the slit to pass over the surface of the heat sink 11 adjacent to the inner side 20*b* of the slit, as indicated by the arrows F1, F2 and F3 in FIG. 4.

Figure 5:
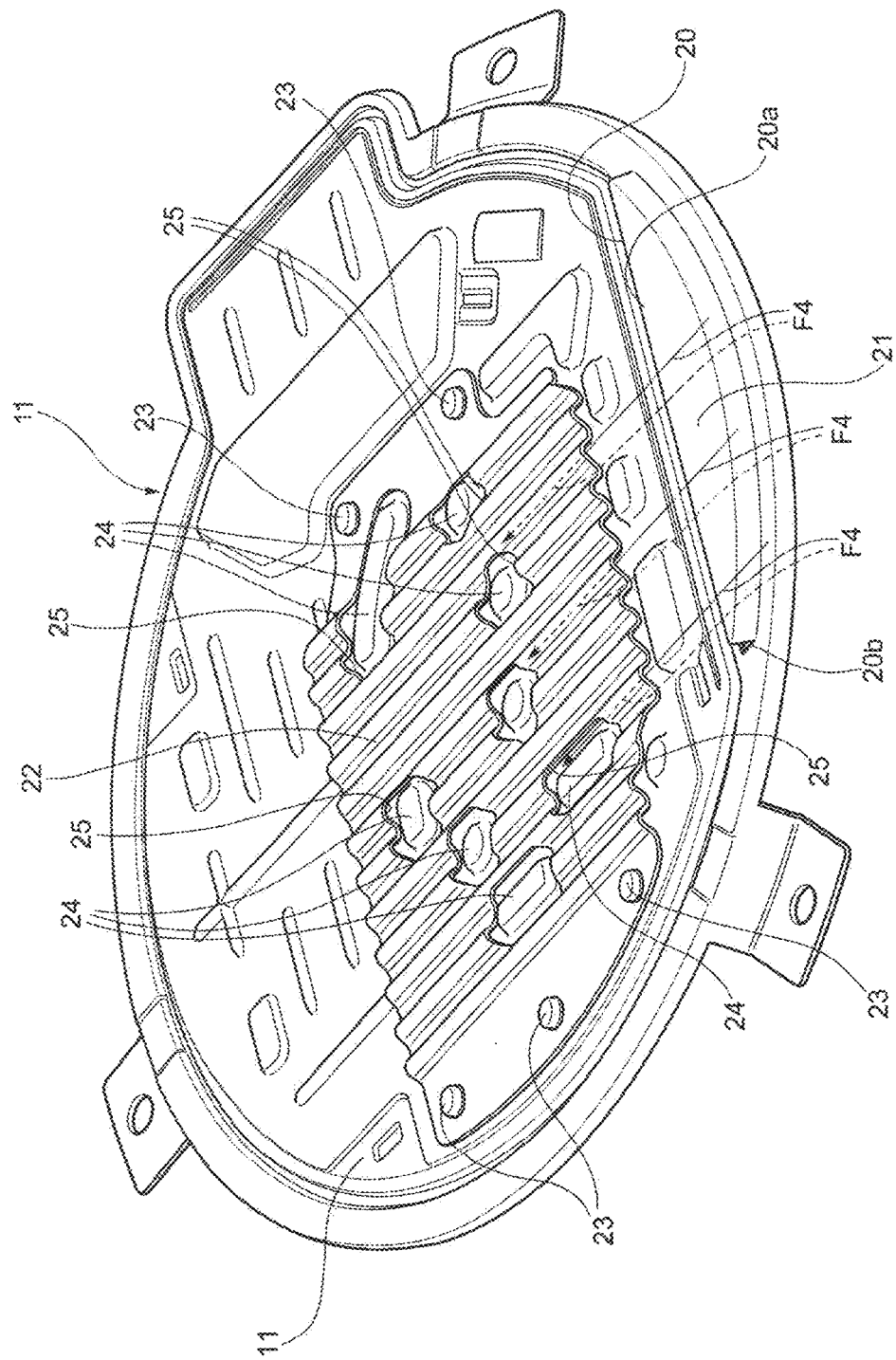
FIG. 5 is a perspective view of a heat sink of a fan assembly according to the present invention.
Figure 6:
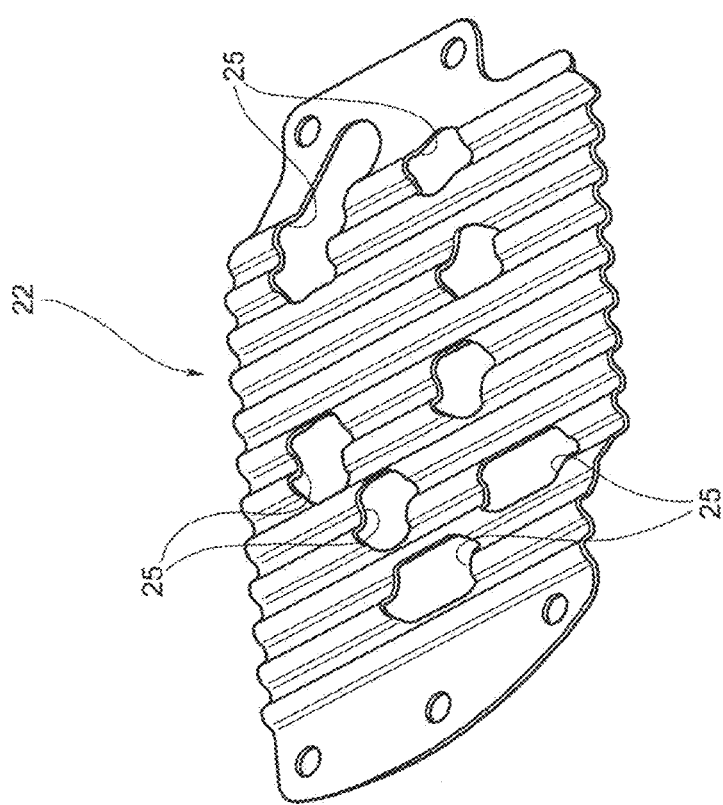
FIG. 6 is a view of an additional deflector included in the heat sink of to FIG. 5.

Conveniently, but not necessarily, a deflector 22 may be associated with the main outer surface or face of the heat sink 11, as illustrated in FIGS. 5 and 6. This solution can be used in particular cases.

In the embodiment illustrated, the deflector 22 is made from a metal sheet having a plurality of parallel corrugations, fixed to the heat sink 11, for example, by means of rivets 23 as indicated in FIG. 5.

Conveniently, the deflector 22 extends near the slit 20 of the heat sink 11, and its corrugations are essentially orthogonal to the slit.

The corrugations of the deflector 22 form a plurality of small ducts capable of capturing part of the air flow which, in use, comes out through the slit 20, as indicated by the arrows F4 in FIG. 5.

The heat sink 11 may have a plurality of outwardly projecting bosses 24, at the positions of some of the electronic components of the controller 9. Correspondingly, openings 25 are provided in the deflector 22, the profiles of these openings substantially corresponding to those of the bosses 24.

In the assembled condition of the deflector 22, the bosses 24 protrude, at least partially, towards the associated openings 25 in the deflector. Consequently, part of the air flow which is channelled between the outer surface of the heat sink 11 and the inner surface of the deflector 22 is directed so as to pass specifically over the aforesaid bosses 24.

In some cases, the heat sink 11, and the deflector 22 that may be associated with it, can be used to improve the efficiency of removing the heat developed by the motor 6 and by the associated controller 9, in use.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

For example, the rotor may be an inner rotor with the fan attached to the rotor via the motor shaft.

The invention claimed is:

1. A fan assembly, comprising:
a fixed support structure;
an electric motor, comprising a stator fixed to the fixed support structure and a rotor,
a controller having components in a thermal exchange relationship with a plate-like heat sink which extends transversely with respect to a rotational axis of the motor; and
a fan, fixed to the rotor of the motor,
wherein the heat sink has a ventilation opening with an inner side and an outer side along a radial direction of the motor, a wing corresponding to the ventilation opening defines a slit with respect to the heat sink in an axial direction of the motor, and the wing is adapted to deflect airflow coming into the ventilation opening, sending it through the slit to flow to an outer surface of the heat sink.

2. The assembly of claim 1, wherein the fan comprises a hollow hub from which a plurality of blades extend; the hub surrounds the motor, defining an annular space with respect thereto; a peripheral region of the heat sink facing the annular space has the ventilation opening; and the wing is adapted to deflect part of the air flow coming from the annular space, sending it through the slit to flow to the outer surface of the heat sink.

3. The assembly of claim 1, wherein the wing extends from the outer side of the ventilation opening and offsets with respect to the heat sink in the axial direction of the motor.

4. The assembly of claim 1, wherein the wing is substantially parallel to the heat sink.

5. A heat exchanger of a vehicle, comprising a fan assembly according to claim 1.

6. A fan assembly for a heat exchanger of a vehicle, comprising:

a fixed support structure, comprising an outer frame and an inner member connected to the frame by a plurality of spokes;

an electric motor, comprising a stator fixed to the inner member, and a rotor rotatable with respect to the stator, a controller having components in a thermal exchange relationship with a plate-like heat sink which extends transversely with respect to a rotational axis of the motor at one end of the stator; and a fan, fixed to the rotor at the other end of the stator and having a hollow hub from which a plurality of blades extend; the hub having a front wall intended to be struck by air flow caused by the fan and a lateral skirt which surrounds the motor defining an annular space with respect thereto; a plurality of inlet openings being provided in said front wall through which air flows into the annular space, wherein the heat sink has a slit in a peripheral region facing the annular space, the slit is open to the annular space and an outer surface of the heat sink, the slit has an inner side and an outer side offset with respect to the inner side in an axial direction of the motor, a portion of the heat sink adjacent to the outer side of the slit forming a wing adapted to deflect, in use, part of the air flow coming from the annular space, sending it through the slit to pass over the outer surface of the heat sink adjacent to the inner side of the slit.

7. The assembly of claim 6, wherein the heat sink is made of cut and stamped sheet metal.

8. The assembly of claim 6, wherein the heat sink further comprises an inner surface opposite to the outer surface, and an associated deflector positioned closer to the outer surface of the heat sink than the Inner surface of the heat sink, so as to define, between the deflector and the heat sink, at least one path for part of the flow of air which, in use, comes out from the slit.

9. The assembly of claim 8, wherein the deflector is substantially a corrugated sheet, having a plurality of parallel corrugations arranged in a direction essentially orthogonal to the direction of the slit.

10. The assembly of claim 8, wherein the heat sink has at least one outwardly projecting boss, at a position of a corresponding component of the controller, and the deflector correspondingly has an opening surrounding the boss, so that, in use, the air flow channeled between the heat sink and the deflector is directed to pass over the boss.

11. The assembly of claim 6, wherein the inner member is annular.

12. The assembly of claim 6, wherein the motor is an outer rotor motor.

13. The assembly of claim 6, wherein the motor is a brushless motor.

14. The assembly of claim 6, wherein the motor is a D.C. motor.

15. The assembly of claim 6, wherein the hub comprises a plurality of inner ventilation vanes which extend from an inner surface of the hub and are adapted to generate, in use, a flow of air through the annular space.

16. The assembly of claim 6, wherein the slit extends in a direction forming an angle with respect to the radial direction of the motor.

* * * * *